July 18, 1950 H. P. MIXER 2,516,013
SUCCESSIVE SENSING DEVICE FOR TABULATORS
Filed Dec. 22, 1948 6 Sheets-Sheet 1

FIG. 1

INVENTOR.
HAROLD P. MIXER
BY
John L Sterling
ATTORNEY

July 18, 1950    H. P. MIXER    2,516,013
SUCCESSIVE SENSING DEVICE FOR TABULATORS
Filed Dec. 22, 1948    6 Sheets-Sheet 3

*INVENTOR.*
HAROLD P. MIXER
BY
ATTORNEY

July 18, 1950  H. P. MIXER  2,516,013
SUCCESSIVE SENSING DEVICE FOR TABULATORS
Filed Dec. 22, 1948  6 Sheets-Sheet 4

INVENTOR.
HAROLD P. MIXER
BY
ATTORNEY

July 18, 1950

H. P. MIXER

2,516,013

SUCCESSIVE SENSING DEVICE FOR TABULATORS

Filed Dec. 22, 1948

*INVENTOR.*
HAROLD P. MIXER
BY *J. L. Sterling*
ATTORNEY

July 18, 1950        H. P. MIXER        2,516,013
SUCCESSIVE SENSING DEVICE FOR TABULATORS
Filed Dec. 22, 1948        6 Sheets–Sheet 6

*INVENTOR.*
HAROLD P. MIXER

BY *JR L Sterling*

ATTORNEY

Patented July 18, 1950

2,516,013

UNITED STATES PATENT OFFICE 2,516,013

SUCCESSIVE SENSING DEVICE FOR TABULATORS

Harold P. Mixer, Rockville Centre, N. Y., assignor to Remington Rand Inc., New York, N. Y., a corporation of Delaware Application December 22, 1948, Serial No. 66,633

17 Claims. (Cl. 235—61.11)

This invention relates to record controlled tabulating machines, and more particularly to an improved mechanism for controlling the successive sensings of a plurality of areas of a record card. The invention consists chiefly of improvements on or additions to mechanism of the sort disclosed in the patent to John Mueller, 2,421,078, dated May 27, 1947, and is shown as applied to a machine of the type disclosed in the patent to Mueller, 2,381,361, dated August 7, 1945.

Mechanism of the sort involved, herein called a multi-stage selector mechanism, has for its function the enabling of a machine to sense a different area or field of the same record card during each of a plurality of successive machine cycles.

Heretofore, the multi-stage selector mechanism performed its function in the machine by alternately enabling those portions of the sensing mechanism appropriate to two areas or fields of a card. This operation was performed under card control which was such, that, if desired, only the primary field of each card was sensed, the alternating action of the mechanism being suppressed.

However, it has been found desirable to increase the number of fields thus controlled from two to three, and to sense various combinations of said fields in various sequences. Furthermore, it has been found desirable to interrupt the sequencing action of the mechanism in the event that a totalling or special paper feeding operation should intervene and ineffectuate the sensing mechanism for one or more cycles.

Therefore, one object of the invention is to increase the number of card areas or fields which can be sensed successively under control of said mechanism.

Another object of the invention is to provide means whereby a variety of combinations of card fields can be sensed in a variety of sequences.

Another object of the invention is to provide means whereby the sequencing action of said mechanism can be interrupted during those special machine cycles during which the sensing mechanism is ineffectuated.

In order that a card can be retained in the sensing mechanism for the required number of cycles, and that no other card will be fed into the machine until that card is ejected, means are provided to disable the card feed and card stop mechanisms.

In the former mechanism, this function was accomplished through means actuated by the sensing mechanism under card control. However, it has been found that this method places an undue strain on the sensing mechanism.

Therefore, a further object of the invention is to so modify said mechanism as to enable it to perform said function without strain to the sensing mechanism.

A still further object of the invention is to improve the mechanism generally.

In the former mechanism means associated with the well known no-card pin were provided for latching in disabled condition under control of said no-card pin the various means for enabling the sensing pins. However, said former means were complicated and required the utmost precision in their manufacture and assembly.

It is, therefore, another object of the invention to provide improved, simple, and easily manufactured and assembled means to latch in disabled condition under control of the no-card pin the various means for enabling the sensing pins.

Other objects and structural details of the invention will be apparent from the following description when read in connection with the accompanying drawing, wherein.

Figure 1:
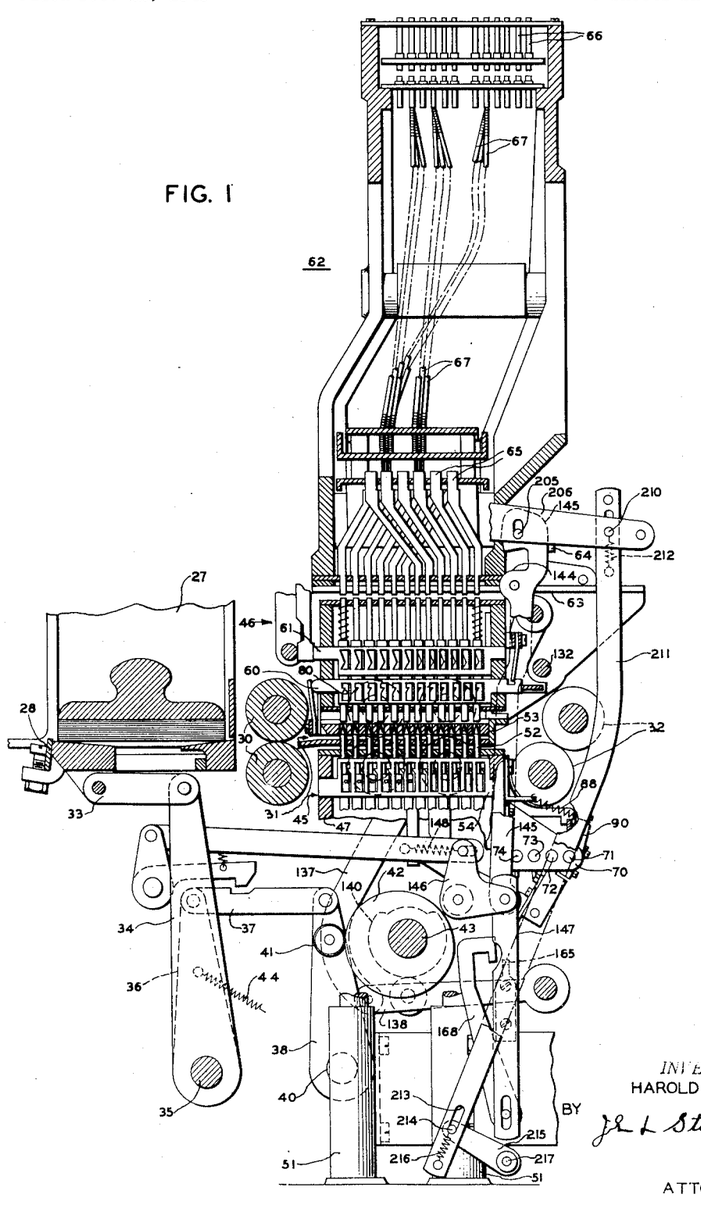
Fig. 1 is a sectional view through a portion of a tabulator on a fore and aft plane with many parts omitted or broken away and showing the location of the mechanisms of the invention, the section being taken on the line 1—1 of Fig. 2.
Figure 2:
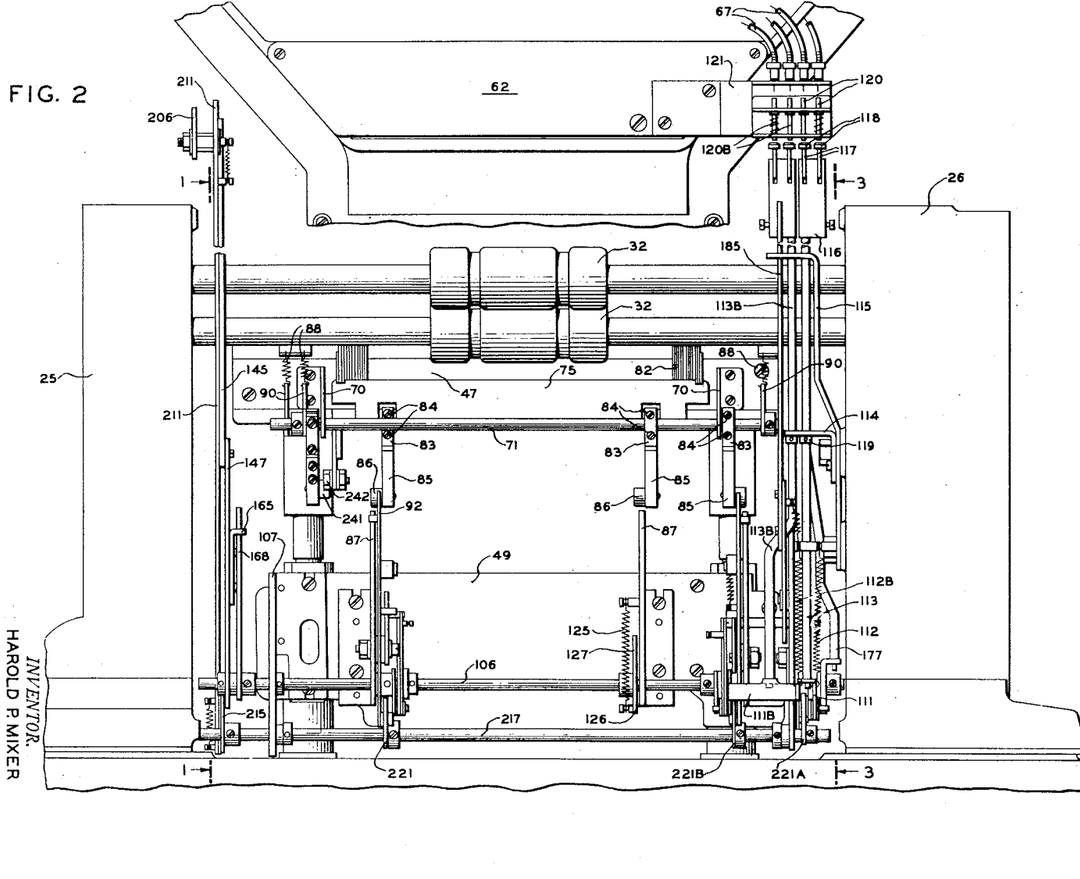
Fig. 2 is a rear view of the lower part of a tabulator with certain parts removed or broken away to more clearly show the mechanism of the invention.

The tabulating machine to which the invention is shown applied will be described only in so far as is necessary to an understanding of the invention, reference being made to the above cited Patent 2,381,361 for a more complete description thereof. As shown in Figs. 1 and 2, the latter of which is taken from the rear, the machine comprises right and left side frame casting 25 and 26 between which is mounted the majority of the mechanism. Cards to be processed by the machine are placed in a hopper 27 wherefrom they are fed by a picker knife 28 to feed rollers 30 which pass them into the sensing chamber 31. The cards are removed from the sensing chamber by skid rollers not lettered and are fed by a pair of eject rollers 32 into the usual receptacle, not shown.

The picker knife 28 (Fig. 1) is reciprocated through a link 33 by an arm 34 fast on a cross rock shaft 35. The shaft 35 also has fast thereon an arm 36 connected by a link 37 with an arm 38 pivoted on a stud 40 in the frame casting 26, said arm 38 carrying a follower roller 41 held against the periphery of a cam 42 on the base drive shaft 43 of the machine by a spring 44. A complete rotation of the shaft 43 measures a cycle of the machine and with the mechanism thus far described, the picker knife 28 is reciprocated once during each machine cycle.

The sensing chamber 31 constitutes the space between the upper and lower perforated plates, respectively, of a reciprocating sensing pin box 45 and a stationary set pin box 46, the former being carried in a frame 47 which, through pitmans pivoted thereto and eccentrics 50 (Fig. 3), is reciprocated vertically on guide posts 51.

As the sensing pin box 45 is raised, sensing pins 52 therein that find perforations in a card detained in the sensing chamber by a closed card stop 53 (Fig. 1) are locked up by the suitably timed lateral movements of paired locking slides 54 (Figs. 4-7) to positively raise data retaining set pins 58 mounted in the set pin box 46. The raised set pins 58 are latched up by latch plates 60 (Figs. 1 and 3) and upon a change of designation data a preselected group of said pins initiate a total taking operation through actuation of cam slides 61, in the manner set forth in the above cited Patent 2,381,361.

The upper part of the tabulating machine includes a wiring unit 62 slidably positioned on grooved rails 63, and releasably latched in place above the set pin box 46 by manipulation of the usual finger piece 64. The movements of the set pins 58 are, in the illustrated instance, transferred to push rods 65 in the wiring unit, and thereby to upper pins 66 through Bowdens 67, said upper pins 66 being used to set permutation bars as in Patent 2,381,361.

The mechanism about to be described is directed to the successive sensing in the same card, of different zones, of different fields of the same zone, and of different fields of different zones; and it is deemed desirable first to define what is meant by "zone" and "field." A card containing ninety columns is divided lengthwise into forty five rows of twelve perforation positions, each such row being divided into an upper and a lower column of six perforation positions each. The upper forty five columns constitute an upper zone and the lower forty five columns constitute a lower zone. A field is made up of any desired number of columns in a zone.

In order to sense successively the different zones or fields of a card, the sensing pins 52 appropriate to said zones or fields are selectively locked up as the card is successively sensed. To this end, the rear bar of the frame 47 for the sensing pins has secured thereon brackets 70 (Figs. 1 and 2) in which are journalled rock shafts 71, 72, 73 and 74. As shown in Figs. 4-7, said shafts are slotted longitudinally to receive, respectively, rocker blades 75, 76, 77 and 78, which extend substantially the length of the sensing pin box 45. Each row of sensing pins 52 is flanked on both sides by locking slides 54, one of said slides having locking teeth 80 for the six pins of the upper column of a row, and the other slide having locking teeth 80 for the six pins of the lower column. The pins 52 have the usual locking extrusions 81, beneath which are projected the locking teeth 80 to lock up the sensing pins that have found perforations in a card, when the slides are moved toward the left in Fig. 1.

Figure 8:
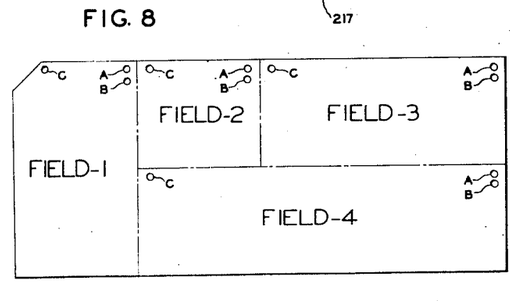
Fig. 8 is a diagrammatic view of a record card arbitrarily divided into a plurality of fields and having numerous control holes punched therein.

The slides 54 are guided for lateral movement in the framing of the sensing pin unit and each is prolonged rearward into a tail or finger 82 having a notch to engage one of the rocker blades 75—78 (Figs. 4, 5, 6, and 7). Which of the blades is engaged by each slide is, of course, dependent on the results desired. For purposes of the present description it will be assumed that the record cards to be handled by the machine are divided up into four fields as shown in Fig. 8, and that those columns of sensing pins falling within fields 1, 2, 3 and 4 have their slides in engagement with blades 75, 77, 78 and 76, respectively. It will be understood that the specific division of the card shown is used only to clarify the description, the actual division of a card being done by the individual users of the machine to suit their respective requirements.

Each of the shafts 71—74 (Figs. 4-7) has secured thereon by a clamping block 83 and screws 84, an arm 85 which at its lower end carries a roller 86 cooperating with a fixed cam 87. All of the cams 87 are identical in shape with the one shown in Fig. 4, but each is located in a position to actuate one of the four arms 85. The cams 87 are suitably fastened to a fixed frame bar 49 in the base of the machine. In the mid-cycle positions of the parts shown in Figs. 4-7, the sensing pin box is at the low point of its travel, the shafts 71—74 are rocked to their counter-clockwise positions by the cams 87, and the locking slides 54 are withdrawn to inactive position. When, however, during the latter half of the cycle the pin box moves upward, the rollers 86 move free of the cams 87 (see Fig. 3) and the shafts 71—74, unless otherwise retained in their counter-clockwise position, are rocked clockwise by springs 88 acting on arms 90 secured to the ends of said shafts (Fig. 2). This clockwise rocking of the shafts 71—74 moves the slides 54 to locking position and the sensing pins 50, finding perforations in a card, are locked up to permit the corresponding set pins 58 to be elevated thereby.

In the illustrated instance the designative data peculiar to a group of cards is punched in field #1 (Fig. 8) of each card of said group, which results in that said field is sensed during each cycle of the machine to prevent the designation pattern set up on the set pins 58 (Fig. 1) from being erased and actuating the slides 60 to cause a totalling operation of the machine at an inappropriate time. The shaft 71 which controls the locking up of the sensing pins in field #1 is, therefore, operated to enable the locking slides 54 for said pins during every cycle of the machine, the same as described in the Patent 2,421,078.

However, as it is desired to sense the data in fields 2, 3 and 4 during successive cycles of the machine instead of on every cycle, means are provided to prevent operation (clockwise rocking) of the first, second, and third stage shafts 73, 74 and 72, respectively, except on preselected cycles.

The cam 87 associated with the first stage shaft 73 (Fig. 7) has pivoted thereto at 91 a bell-crank 92 having a roller 93 in the upper arm thereof which is held against the rear edge of the cam 87 by a spring 94. The forward edge of said upper arm is so formed as to constitute a gate or cam face 95 to prevent the roller 86 from riding up the incline of cam 87 to rock the shaft 73 and lock up the associated sensing pins 52. However, the spring 88 which tends to rock the shaft clockwise is stronger than the spring 94 and in order to hold the gate 95 in effective position the lower arm of bell-crank 92 is provided with a stud 96 adapted to be engaged by a latch arm 97 pivoted on a stud 98 in the base portion of the first stage cam 87. This much of the mechanism is substantially identical with that disclosed in the Patent 2,421,078. However, the means about to be described for controlling the latch arm 97 have been modified and improved, as presently will appear. About its pivot said latch arm is provided with a stud 100 (Fig. 9) against which the two arms 101 and 102 of a scissors are tensioned by a spring 103. At their lower ends the arms 101 and 102 (Fig. 9) are pivoted together on a stud 105 in an arm 99 fast on a rock shaft 106 which is journaled at its left hand end (Fig. 2) in a bracket 107, and at its other end in the lower part of the rightmost cam 87. Near their lower ends the adjacent edges of arms 101 and 102 are provided with extrusions which are held against the shaft 106 by the spring 103.

Figure 9:
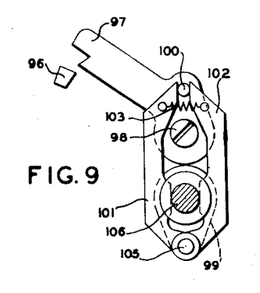
Figs. 9–11 are fragmentary views showing the latch control mechanisms shown in Figs. 7, 5, and 6, respectively, the parts being in their normal positions.
Figure 12:
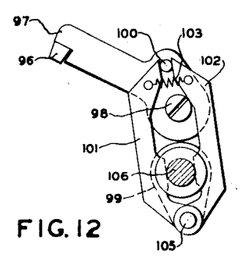
Figs. 12–14 are views similar to Figs. 9–11, but with the parts in their operated positions.

The construction is such that normally the machine is conditioned to sense field #2, but it is not desired to sense said field, the shaft 106 is rocked clockwise from the position of Fig. 9 to that of Fig. 12, as will be described below, moving the pivot 105 of the scissors rightward. However, the scissors is not spread open by the shaft 106 but itself rocks counter-clockwise to the position of Fig. 12, the two arms 101 and 102 being held together by the spring 103. As shown in Fig. 12 the rocking of the scissors moves latch arm 97 into engagement with stud 96 conditioning gate 95 (Fig. 7) to prevent a clockwise rocking of shaft 73. This holds the associate slides 54 in disabled position and those sensing pins 52 in field #2 which find perforations in the card are not locked up to elevate their associate set pins 58. If the shaft 106 is rocked at a time when the lever 92 (Fig. 7) has been rocked counter-clockwise by arm 85 with the stud 96 in position to prevent movement of the arm 97, then only arm 101 of the scissors rocks, the arm 102 being tensioned against the stud 100. When, however, the stud 96 moves back to normal position spring 100 rocks the arm 102 and through the stud 100 rocks latch arm 97 into engagement with said stud 96. The parts move back to normal position when the shaft 106 rocks back to normal.

The mechanism for preventing the operation of the second stage shaft 74 is identical in many respects to that just described and like parts are given the same reference numerals with the letter A added. However, said mechanism, unlike its first stage counter part, is normally in condition to prevent operation of the second stage shoaft 74 and thereby to prevent sensing in field #3.

Figure 11:
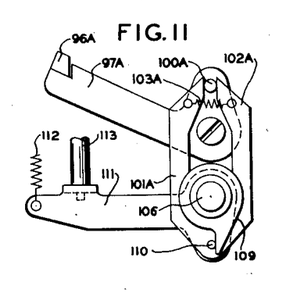
Figure 14:
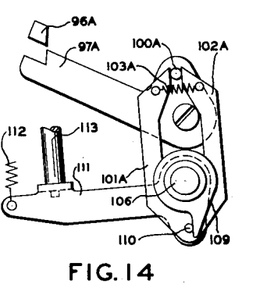

The lever 92A (Fig. 6) is like the lever 92 in all respects and operates in the same way to prevent the roller 86 from riding up the incline of the second stage cam 87. The stud 96A in said lever is, however, shaped differently from the stud 96 and is engaged from underneath by a clockwise movement of latch arm 97A, in contradistinction to latch arm 97 which is rocker counter-clockwise to engage its stud 96. The scissors 101A, 102A (Figs. 11 and 14) operates in the same way as the scissors 101, 102, but unlike the latter, is operated to free stud 96A from the latch 97A which is normally in engagement therewith (see Fig. 11). At their lower ends the arms 101A and 102A are pivoted together on a stud 110 in a downwardly extending portion of an arm 111 loosely mounted on the shaft 106 and urged clockwise by a spring 112. Fast on shaft 106 in the path of movement of stud 110 is an arm 109, whereby when arm 111 is rocked, as described below, to disengage latch 97A (Fig. 14), the shaft 106 is rocked counter-clockwise to engage latch 97 with the stud 96 (Fig. 12) as hereinbefore described.

The arm 111 is operated by a long upwardly extending rod 113 (Figs. 2 and 3) guided in brackets 114 and 115 and terminating at its upper end in a block 116 having pivoted therein two interponents 117. It will be noted that rod 113 carries a collar 119, which, by engaging the underside of bracket 114, limits the action of spring 112. The interponents 117 each have a large flat head 118, which, when the interponent is set active, faces upward (Fig. 2) but which, if the interponent is disabled by swinging it rearward, moves to the position shown in Fig. 3. Directly above said interponents are a series of plungers 120 spring urged upward in a bracket 121 fastened to the rear part of the removable wiring unit 62. In register with each, or either, of said plungers is the inner wire of a Bowden 67 leading from one of the push rods 65 (Fig. 1).

It will be remembered that the first stage shaft 73 controls the sensing of field #2 (Fig. 8) and the second stage shaft 74 controls the sensing of field #3. Assuming for the present that it is desired to sense field #3 immediately following field #2, then a control perforation A (Fig. 8) is punched in one or the other of any two desired positions in field #2 and the push rods 65 in these positions are wired to the plungers 120 (Fig. 2).

The construction is such that when field #2 is sensed near the end of a cycle, the Bowden 67 connected to one or the other of the plungers 120 is actuated, and, if the associated interponent 117 is set active, it depresses the rod 113 which, at its lower end (Figs. 6 and 14) rocks arm 111. Through the scissors 101A, 102A, arm 97A is tensioned clockwise by the spring 103A, but does not rock clockwise until during the following cycle the sensing pin unit moves downward and the friction between latch arm 97A and stud 96A due to the pressure of roller 86 on lever 92 is relieved. Thus, shaft 74 will be free to rock and allow the locking up of those pins entering perforations in field #3 of a card during that cycle. At the same time that arm 111 is rocked, shaft 106 is rocked counterclockwise by arm 109, which through arm 99 and scissors 101, 102 and spring 103 (Figs. 7 and 12) tensions latch arm 97 counterclockwise. At this time the first stage roller 86 is in rocked position, with the locking slides 54 associated therewith in position to lock up the sensing pins 52 in field #2, and, therefore, the lever 92 is in its counter-clockwise position with the stud 96 underlying arm 97 and preventing the latter from rocking. When during the following cycle the sensing pin unit moves downward, lever 96 rocks clockwise and spring 103 snaps latch arm 97 into engagement with stud 96 (Fig. 12) to prevent sensing in field #2 during that cycle. At the end of the cycle, just as the sensing pins 52 in field #3 are raising their associated set pins 58 to their highest point, the set pins 58 in field #2 are retracted as described in the aforementioned Patent No. 2,381,361 and the pressure on the Bowden 67 leading to the plunger 120 is relieved, allowing the spring 112 to rock arm 111 back to normal position. However, the latch arm 97A does not engage stud 96A until during the course of the following cycle the sensing pin box moves downward, the same as described hereinbefore with reference to latch arm 97 and stud 96. If only fields #2 and #3 are to be sensed, the return to normal of arm 111 moves the pin 110 away from arm 109 (Fig. 11) allowing the shaft 106 to be rocked clockwise by a spring 125 (Fig. 4) acting on an arm 126 of a bell-crank fast on said shaft, said rocking movement being limited by another arm 127 of said bell-crank coming into contact with the fixed frame plate 49.

Figure 4:
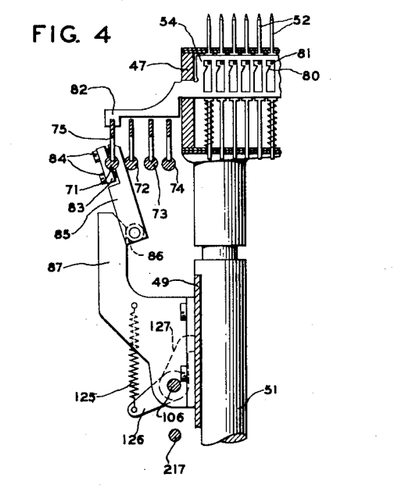
Figs. 4–7 are left hand fragmentary sectional views of the mechanism associated with the locking up of the sensing pins in different card areas, each view showing the mechanism associated with a different area.
Figure 5:
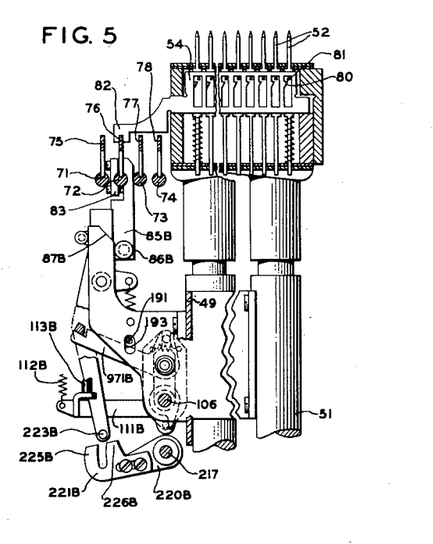

This clockwise movement of shaft 106 allows the latch arm 97 to be disengaged from stud 96 by the spring 103 when the friction between said stud and latch is relieved by the descent of the sensing pin box, and the machine is conditioned to sense field #2 of the next card, the old card being ejected from, and another card fed into the machine in a manner to be described hereinafter.

However, for those instances where it is desired to sense field #4 following field #3, a third stage mechanism substantially identical with the second stage mechanism is provided to control shaft 72.

Figure 10:
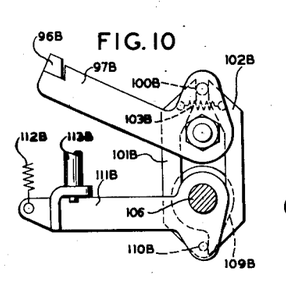

The third stage mechanism is shown in Figs. 2, 5, 10 and 13 and is given the same reference numerals as the second stage mechanism but with the letter B added. In Fig. 10, the parts are shown in normal position with the latch arm 97B in engagement with stud 96B to prevent rocking movement of the shaft 72 and thereby to prevent sensing of field #4.

In order to disengage latch arm 97B from stud 96B, a control hole B (Fig. 8) is punched in one or the other of two positions in field #3, and the push rod 65 (Fig. 1) in said position is wired to one or the other of the plungers 120B (Fig. 2).

The construction is such that when field #3 is sensed at the end of a cycle, the rod 113B (Fig. 2) is depressed and rocks arm 111B (Figs. 10 and 13) which, through scissors 101B, 102B (Fig. 10) and spring 103B puts latch arm 97B under tension to move counter-clockwise. At the same time stud 110B acting on arm 109B maintains shaft 106 in its counter-clockwise position, not allowing it to be rocked clockwise following the retraction of the set pins 58 in field #2, which retraction takes place at about the same time that the rod 113B is depressed.

Figure 13:
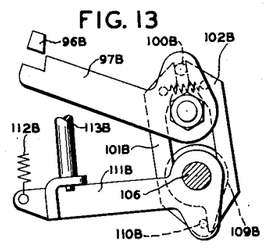

When, during the course of the following cycle, the sensing pin box moves downward and the friction between stud 96B and latch arm 97B is relieved, said latch arm is disengaged from the stud, as shown in Fig. 13, and the machine is conditioned to sense field #4 at the end of that cycle. When said field is sensed, the set pins 58 in field #4 are retracted and the rod 113 returns to normal, putting latch arm 97B under spring tension to reengage stud 96B and allowing shaft 106 to rock clockwise, which (Fig. 12) puts latch arm 97 under spring tension to disengage from stud 96 as hereinbefore described. When the sensing pin box moves downward during the following cycle latch arm 97B engages stud 96B (Fig. 10) and latch arm 97 is disengaged from stud 96 (Fig. 9) and the machine is again conditioned to sense field #2.

Whereas it has been described that the mechanism senses fields 2 and 3 or 2, 3 and 4 in the succession named, it can sense fields 2 and 4 or 2, 4 and 3 in those successions merely by punching the appropriate control hole in the second position mentioned to be in field #2 or in any desired position in field #4 and appropriately wiring said positions to the plungers 120 or 120B. For example, if it is desired to sense fields 2, 4 and 3 in that succession, field #2 will contain a control hole B wired to a plunger 120B, and field #4 will contain a control hole A wired to a plunger 120. It is evident, therefore, that a large variety of different combinations of fields can be sensed successively if the cards are provided with the appropriate control holes.

*Card feed and card stop*

In order to retain a card in the sensing chamber for the requisite number of cycles and to prevent other cards from feeding into the sensing chamber, means, presently to be described, are provided to disable the card feed mechanism and to maintain the card stop closed.

As described in Patent 2,381,361 the card stop 53 consists of an angle bar of sheet metal (Fig. 15) fastened near either end to uprights 130 articulated with levers 131 fast on a rock shaft 132, one of said levers being connected by a link 133 to an arm 134 fast on a stub shaft 135. At its other end shaft 135 carries an arm 136 connected by a depending link 137 with a lever 138 carrying a roller pressed against a cam 140 on the drive shaft 43 by a spring. This cam consists of two concentric parts, one higher than the other and connected by inclines, and it holds the card stop closed except for a sufficient period in which the shaft 132 is rocked by a spring to open it and permit the just sensed card to be fed out of the sensing chamber just as a new card is being fed thereinto.

The card stop is prevented from opening by latching the shaft 132 in normal position. At its left hand end in Fig. 15, shaft 132 carries an upright arm 141 which has fastened thereto a forwardly extending arm 142 having in its free end a stud 143. A vertical link 144 guided for up and down movement on the shaft 106 has pivoted to its upper end a second upright link 145 and the horizontal arm of a bell-crank 146, said link 145 having an enlarged upper portion, a pin 147 working in a slot which guides the link for up and down movement. The two links normally are held in their upper positions by a spring 148 acting on the vertical arm of bell-crank 146, and when in such position a notch 150 in the enlarged upper end of link 145 is disposed in alignment with the stud 143. Therefore, the shaft 135 is free to rock and open the card stop, the stud 143 moving into the notch 150. To prevent the shaft 135 from rocking, the link 45 is moved downward until the surface 151 thereof above the notch comes into alignment with the stud 143 to block movement of the latter. This is done by a forwardly extending link 152 connected at its rear end to the upright arm of bell-crank 146 and at its forward end to an arm 153 on a rock shaft 154. Also fast on shaft 154 is a hook arm 155 urged out of engagement with a notch in the card feed link 37 by a spring 156. Overlying hook 155 but normally held out of contact therewith by a spring 157 is the bent-off arm 158 of a lever 160 pivoted at 161 and carrying a roller 162 pressed against a cam 163, on the shaft 43, by the spring 157.

The construction is such that, at the appropriate time during each cycle of the machine, cam 163 (Fig. 15) rocks the hook 155 into engagement with the notch in link 37 to disable the card feed in familiar manner. At the same time, through shaft 154 and arm 153, the rocking of hook 155 pushes link 152 rearward (to the left in Fig. 15) rocking bell-crank 146 counter-clockwise (Fig. 15) which moves incline 150 into position to prevent movement of stud 143 and maintain the card stop closed.

In order to maintain the parts in the positions to which they momentarily are moved by the cam 163 for an indefinite period of time, the link 147 is provided with a block or stud 165 which, in the normal position of the parts (Fig. 17) lies above and behind the lower edge of the lip 166 of the horizontal arm 167 of a latch lever 168 fast on the shaft 106. When, however, link 147 is moved downward, as just above described, the stud 165 moves to a position just below the level of the lower edge of said lip.

It will be remembered that when it is desired to sense successively a plurality of fields of a card, each such field, except the last, contains a control hole to cause actuation of one or the other of the push rods 113 or 113B which, through arm 111 or 111B, rocks the shaft 106 to condition the sensing mechanism for that operation.

When the shaft 106 is rocked, the lever 168 rocks with it, bringing the lip 166 directly over the stud 165 (Fig. 15) so that even though the cam 163 ceases to affect the parts, they are locked in their operated positions by said latch lever. It will be noted that with the arrangement just described, all the work that the Bowdens operating the push rods 113 and 113B are dequired to do to disable the card feed and card stop mechanisms is to rock shaft 106 to move latch 168 to active position, the remainder of the work being done by the cam 163 and the latch 168.

When, during the cycle following the sensing of the last field of a card, the sensing pin box moves downward and allows the shaft 106 to return to normal as hereinbefore described, the latch 168 is moved to inactive position and the link 147 can rise to allow shaft 132 to rock and open the card stop. At the same time link 147 rocks hook 155 to free the card feed mechanism. Thus the sensed card is fed out of the sensing chamber and a new card fed thereinto during that cycle.

*Sensing one field only*

In some instances it is desired to sense only one of the fields of each card, that is to say, it may be desired to sense only field #2, or field #3, or field #4 (Fig. 8) of each card.

In order to condition the machine to sense only field #2 all that is required is to set the interponents 117 and 117B (Fig. 2) inactive so that even though a control hole A or B (Fig. 8) is punched in that field, it will not cause the shaft 106 to be rocked. Thus, the sensing pins in field #2 will lock up and the card stop and card feed mechanisms will operate during every tabulating cycle, but the sensing pins in fields #3 and #4 remain disabled.

When it is desired to sense only field #3 or field #4, it is necessary that the shaft 106 be rocked to maintain the sensing pins 50 in field #2 disabled as hereinbefore described and at the same time it is necessary to nullify the effect of the rocking of said shaft on the latch 168 (Fig. 15) in order to free the card feed and card stop mechanisms for operation on every tabulating cycle.

To this end the arm 109 (Figs. 6 and 11) which is associated with the second stage mechanism is replaced by the depending arm 175 of a bell-crank (Fig. 3) fast on the shaft 106. The arm 175 operates the same as arm 109, that is to say, when arm 111 is rocked the pin 110 therein acts on arm 175 to rock shaft 106 which results, as hereinbefore described, in moving latch arm 97 into engagement with stud 96 (Fig. 7) to prevent locking of the set pins in field #2. The horizontal arm of bell-crank 176 (Fig. 3) is approximately half the length of the arms 111 and 111B (see also Figs. 5 and 6) and has near its end an ear acted upon by an upright rod 177. Like the rods 113 and 113B the rod 177 is surmounted by a block 116 having pivoted in its upper end an interponent 117 which cooperates with a plunger 178 mounted in the bracket 121 and is operated by a Bowden from the wiring unit 62. Said Bowden is actuated by a selected one of the push rods 65 under control of a control hole C (Fig. 8) punched in the card.

Figures 18, 19, 20:
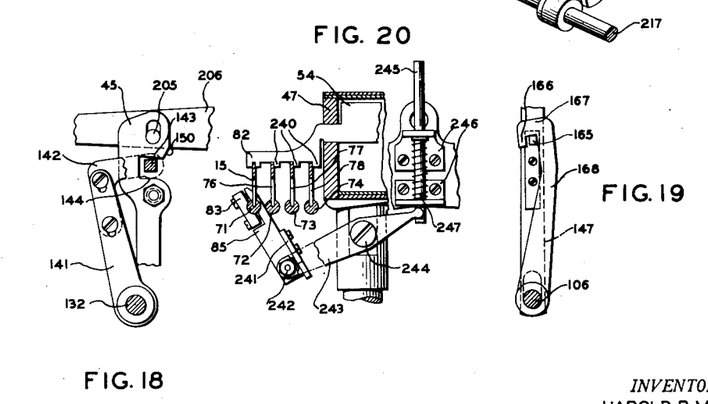
Fig. 18 is a detail view of parts of the control mechanism shown also in Figs. 15 and 17, but with the parts in an operated position.
Fig. 19 is a detail view of a latch shown also in Figs. 1, 15 and 17, but with the latch in a disabled position not shown in the other views.
Fig. 20 is a fragmentary view partly in section showing a device for controlling the mechanism when no card is present in the sensing chamber.

The construction is such that when said control hole C is sensed, the rod 177 is depressed and rocks shaft 106 through the horizontal arm of bell-crank 176. However, since said arm is much shorter than the arm 111 or 111B, the shaft is rocked through a greater angular distance by the former, which results in that the lip 166 (Fig. 15) of latch arm 168 is not moved to a position above the stud 165 in link 147 but is moved past said stud to the position shown in Fig. 19 where said stud is not held down by said lip but rather is free to move up under the arm 167 to free the card stop and card feed mechanisms for normal operation.

Referring to Fig. 12, this extra amount of movement of shaft 106 does not affect latch arm 97 but merely stretches spring 103 somewhat more than there shown.

It will be remembered that normally the machine is conditioned to sense field #2 only, and that a control hole A or B must be provided in that field to condition the machine to sense field

3 or #4 and to prevent sensing of field #2. When it is desired to sense only field #3 or #4 of the cards, the first card to be sensed, usually a control card containing only control perforations, is punched with this control hole A or B in field #2. However, the remainder of the cards have the control hole in field #3 or #4, whichever is the only field that it is desired to sense, in order to maintain the machine in condition to sense that field. In like manner, said cards are provided with a control hole C to actuate the rod 177 (Fig. 3) and prevent the card feed and card stop mechanisms from being disabled as above described. The last card of the group which it is desired to sense in this manner would contain neither control hole (A, B, or C) and after it has been sensed the machine would return to normal and be conditioned to sense field #2 of the next card as hereinbefore described.

The above description takes into account the sensing of field #2, #3, or #4 of each card, but it is evident that it is possible to sense field #2 of some cards, field #3 of other cards, and field #4 of still other cards; or all fields of some cards and any combinations of fields of other cards merely by punching the control holes A, B, and C in the proper places, or not punching them as required.

It is also possible to condition the tabulator to repeat print information contained in a card by the proper use of said control holes. For example, it is possible to print the date contained in a single card on a large number of preprinted checks arranged in sheet form. To this end, a card containing a date in, say, field #3, and having control perforations A in fields #2 and #3, is fed into the machine. During the first cycle, the machine is conditioned by the control hole A in field #2 to sense field #3, which field it will sense during the second cycle and for an indefinite number of cycles thereafter due to the presence of the A control hole in said field and due to the absence of a control hole C in said field to permit the card stop to open and allow the card to be fed out, or a control hole to condition the machine to sense some other field; meanwhile, the machine prints the date during every cycle. When the number of checks on which it is desired to print the date have had said date printed thereon, the card may be free from the chamber by manual means which will presently be described.

Disabling lever

In order to condition the machine to sense all fields on every clcle, the following means are provided to disable the multi-stage selector mechanism.

Figure 3:
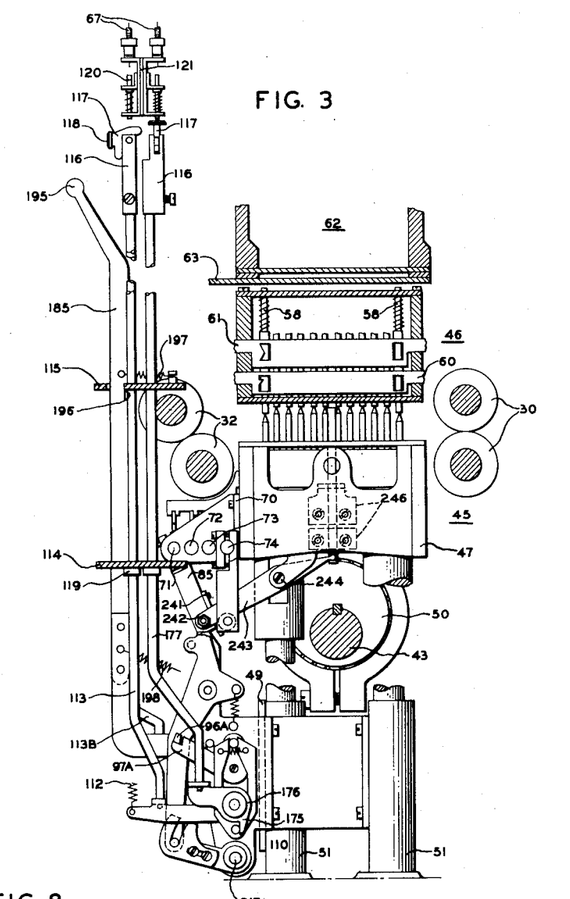
Fig. 3 is a left hand fragmentary sectional view of the mechanism taken on line 3 of Fig. 2.
Figure 16:
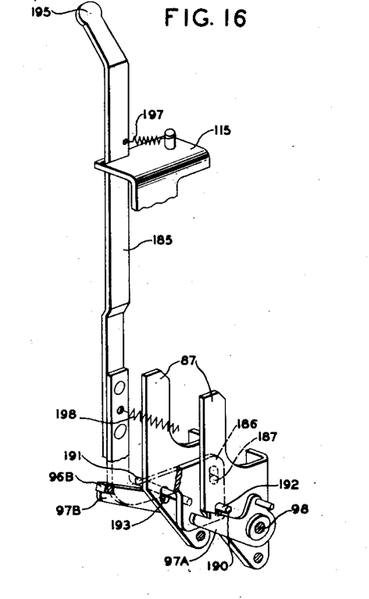
Fig. 16 is a fragmentary isometric view partly in section showing a manually operable control device for disabling the mechanism.

Referring to Figs. 2, 3 and 16, a long upright lever 185 having at its lower end a bent off portion 186, is guided for up and down sliding movement in slots in the bracket 115 and by a stud 187 in the base of the second stage cam 87, which is embraced by a vertical slot in the bent off portion 186. As shown in Fig. 16, the bent off portion 186 carries right and left hand pins 190 and 191, the former extending through a slot 192 in the base of the second stage cam 87 and above the second stage latch arm 97A (see also Fig. 6) and the latter extending through a slot 193 in the base of the third stage cam 87 and above the third stage latch arm 97B (see also Fig. 5). At its upper end the lever 185 is formed into a finger piece 195 (Figs. 3 and 16) for manual manipulation, and is provided with a notch 196 which, when the lever is raised to enable the multi-stage selector mechanism, engages the bracket 115, said notch being held in engagement with said bracket by a spring 197. A spring 198 serves to move said lever downward to disable the multi-stage selector mechanism when notch 196 is disengaged from bracket 115. When the lever moves downward it disables the mechanism through the studs 190 and 191 which rock the second and third stage latch arms 97A and 97B out of engagement with their studs 96A and 96B. Thus, the machine is conditioned to sense field #2 and field #3 on every cycle. However, to completely disable the mechanism the interponents 117 and 117B (Fig. 2) are set to inactive position so that even though a control hole A or B is sensed, the shaft 106 is not rocked to prevent sensing of field #2.

Total control mechanism

As described in the aforementioned Patent 2,381,361, the total control mechanism of the tabulator is such that, when a change of total control designation data is sensed, the normal operation of the machine is interrupted for two cycles, viz., a blank cycle and a total cycle. During these cycles the sensing mechanism operates the same as during tabulating cycles but, as described in said patent, it is prevented from affecting the printing and adding mechanisms of the machine. When a change in grand total control designation data is sensed, the result is the same, except that the normal operation of the machine is interrupted for three cycles, viz., a blank cycle, a total cycle, and a grand total cycle.

There is also described in said patent means whereby the total control mechanism can be set into action to cause an optional total or grand total operation of the machine under control of a control hole punched in some otherwise unused column of a card. In the present instance it is possible that said control hole might be punched in, say, field #2 of a card so as to cause a total or grand total to be taken in the cycles interposed between those in which fields #2 and #3 are sensed. In such event it is necessary that the mechanism remain in condition to sense field #2 until the total operation is completed and not be advanced to sense other fields during the blank and total cycles, else the information in said fields be lost to the machine. Therefore, the following means are provided to prevent the sequential enabling and disabling of the sensing pins in the various fields during a total or grand total operation.

Figure 15:
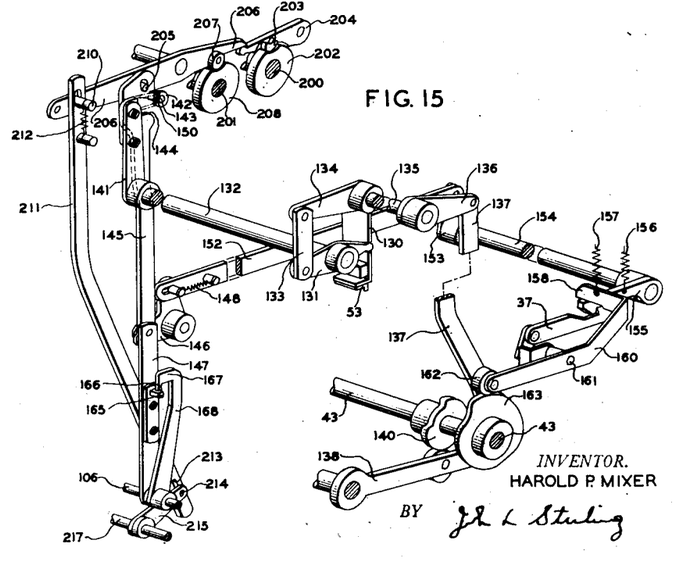
Fig. 15 is a fragmentary isometric view partly in section showing the automatic card feed and card stop control devices provided by the invention.

It will be remembered that the machine is provided with a total cam shaft 200 and a grand total cam shaft 201 (Fig. 15) which shafts are so controlled as to be set into rotation only during a total or grand total operation, the former completing a rotation in two cycles of the machine and the latter in three cycles. As shown in Fig. 15, a cam 202 on shaft 200 is engaged by a roller 203 on an arm 204, said arm at its free end underlying the lever 206, hereinbefore referred to, which carries a roller 207 acting on a cam 208 on shaft 201. The two cams are concentric for the greater part of their periphery but have a low dwell into which the rollers drop when in the normal position of the total taking mechanism. The construction is such that the lever 206 will be held rocked for the duration of every total or grand total operation, the same as described in said patent.

It will be recalled that lever 206 is connected to link 145 by a pin and slot connection 205. It is evident, therefore, that while cam 201 or 202 is rotating, the link 145 will be held in its lower position by lever 206 and the card stop and card feed mechanisms will be prevented from operating, as hereinbefore described.

Figure 6:
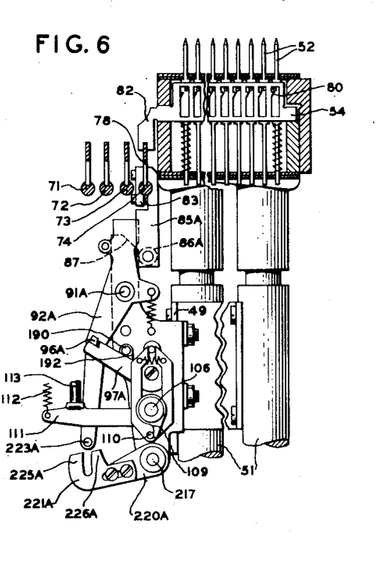
Figure 7:
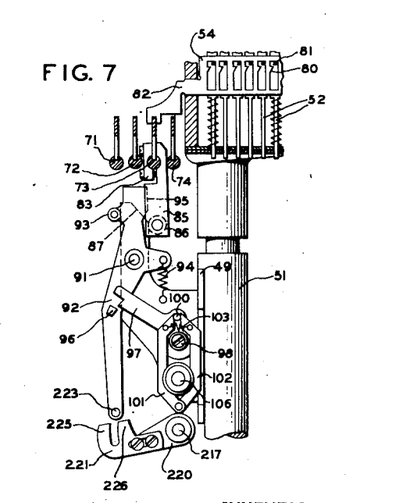

The rearward arm of lever 206 also carries a stud 210 working in a slot in a depending link 211, said link being drawn upward by a spring 212 connected between the stud 210 and a stud in said link. At its lower end (see also Fig. 1) link 211 has a slot 213 embracing a pin 214 in an arm 215, said pin being held in the lower end of the slot by a spring 216. The arm 215 is fast on a transverse rock shaft 217 journalled in the bracket 107 (Fig. 2) and in the base of the second stage cam 87 (Fig. 6). Said shaft also has fast thereon (Figs. 5, 6, and 7) three arms 220, 220A, and 220B, to which are adjustably secured latch plates 221, 221A, and 221B. Each of the levers 92, 92A, and 92B, which, it will be remembered, are rocked counter-clockwise from the positions shown in Figs. 5, 6, and 7, to permit sensing of their associate fields, or are locked in the positions shown to prevent sensing in those fields, is provided at its lower end with a stud 223 adapted to cooperate with the associate latch plate 221. Each such latch plate has two upstanding fingers 225 and 226, so positioned, that if lever 92A, for example, is in the position shown in Fig. 6 and shaft 217 is rocked, the two fingers straddle the stud 223A, as shown in Fig. 3, and prevent any rocking movement of the lever 92A. However, if a lever 92, 92A, or 92B, is in rocked position at the time when the shaft 217 rocks, the finger 226 will move up behind the associate stud 223 and prevent the lever from rocking back to normal while said shaft remains rocked.

The construction is such that no matter what position the levers 92, 92A, and 92B, are in at the beginning of a total or grand total operation, they are retained in that position until said operation is completed, at which time the mechanism will again begin to function as hereinbefore described.

Control by paper feed

The tabulator is sometimes equipped with special paper feeding mechanism of the type disclosed in the copending application 615,968, filed September 13, 1945, now Patent No. 2,476,449, to Joseph M. McDonnell, which mechanism causes the tabulator to execute a blank cycle under certain conditions.

In the present instance this blank cycle is like in all respects to the blank cycle of a total operation, and it is necessary to control the sequencing action of the mechanism the same as for the latter.

To this end, the blank cycle device of the paper feed mechanism which, as fully described in the cited patent, performs its function by actuating the follower levers of the slam bail cams in the total control unit, includes, in the present instance, a depending arm 230 (Fig. 17) to which the follower for the grand total slam bail cam is connected at 231, and the lower end of which overlies a stud 232 in the link 145. The construction is such that every time the arm 230 is moved downward by the blank cycle device the link 145 is depressed and prevents the operation of the card stop and card feed mechanisms.

Figure 17:
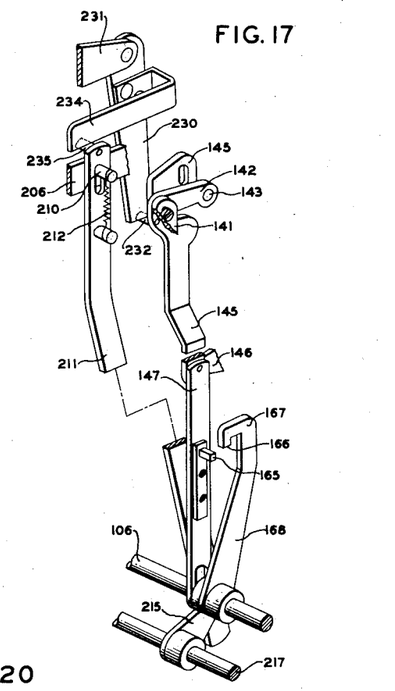
Fig. 17 is a fragmentary isometric view partly in section showing the mechanism whereby the paper feed mechanism controls the operation of the card feed and card stop mechanism.

Fastened to the depending arm 230 is a member 234, having the shape in Fig. 17 so as to bring its free end over a stud 235 in the upper end of link 211. It is evident that when arm 230 is depressed, the link 211 is also depressed the same as for a total operation and with the same results.

No card mechanism

It sometimes happens that a card fails to feed into the sensing chamber, in which event, all of the sensing pins whose locking slides are free to act on that cycle are locked up the same as when said pins sense a perforation in a card. To prevent this, means are provided whereby all locking slides are disabled when there is no card in the sensing chamber.

To this end, the right and left hand end locking slides 54 are blanks (Fig. 20), that is to say, they have no locking windows therein, and said slides have their tails 82 connected to the blade 75 in the regular way and by extrusions 240 thereon to the blades 76, 77, and 78, for movement of the latter in a counter-clockwise direction only. It is evident that if the blade 75 be moved to or held in its normal counter-clockwise position (Fig. 20) the blades 76, 77, and 78, are moved to or are held in their counter-clockwise positions by the extrusions 240. Fastened to the shaft 71 by a clamping block 83 is a second arm 85 (Figs. 2, 3, and 20) which has secured to the forward face thereof a latch plate 241 adapted to cooperate with a stud or nut 242 in the rear arm of a lever 243 pivoted at 244 to the reciprocating pin box 45. The other arm of said lever is engaged in a notch in the lower end of a sensing pin 245 mounted in brackets 246 on the frame 47 and tensioned upward by a spring 247. The pin 245 is so located as to project upward into that portion of the sensing chamber not occupied by the pins 52, in order to sense for the presence of a card.

The construction is such that if a card is present in the chamber the upward movement of pin 245 is arrested, rocking lever 243 and moving stud 242 out of the path of latch plate 241. This permits the arm 85 carrying said latch plate, and shaft 71 to rock, moving the extrusions 240 to inactive position and allowing the blades 76, 77, and 78, to operate as hereinbefore described.

However, if no card is present in the chamber, the pin 245 continues its upward movement and lever 243 is not rocked to remove stud 242 from the path of latch plate 241. This results in that the shaft 71 is prevented from rocking clockwise by the engagement of latch 241 and stud 242, and, through the extrusions 240, prevents shafts 72, 73, and 74, from rocking. Thus, all of the locking slides 54 are held in their disabled positions and no sensing pins are locked up.

It is to be noted that the mechanism just described requires the provision of but one depending arm 85 in contradistinction to the prior mechanism in which each of the shafts controlling the locking up of the sensing pins is provided with a depending arm, each of which must be positioned with great accuracy, relative to the others. Furthermore, the present mechanism interconnects the blades on said shafts by means of the extrusions 240 on the blank slides 54 so that if one blade is latched up by the no card pin, it in turn latches up the other blades, all this in contradistinction to the prior mechanism in which each blade is latched up individually by the no card pin, which method requires a high degree of precision in the manufacture and assembly of the parts.

While I have described what I consider to be a highly desirable embodiment of my invention it is obvious that many changes in form could be made without departing from the spirit of my invention, and I, therefore, do not limit myself to the exact form herein shown and described nor to anything less than the whole of my invention as hereinbefore set forth, and as hereinafter claimed.

What I claim as new, and desire to secure by Letters Patent, is:

1. In a machine of the class described, the combination of a reciprocating carrier, a plurality of rows of sensing pins in said carrier, one or more locking slides for each row of pins, said sides being adapted to latch the pins that find perforations in a card in fixed position relative to said carrier, a plurality of means each to move certain of said slides to locking position and each including a cam, a follower for said cam and a gate to prevent said follower from following said cam, a plurality of latches, one to hold each gate effective, a plurality of means actuated by certain of said sensing pins each to disable one of said latches and to enable another latch, each said means including a member actuated by one of said sensing pins and a scissors mechanism operable by said member to disable its associated latch, and a scissor mechanism operated by either said member to enable said other latch.

2. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means each to move certain of said slides to locking position and each including a cam, a follower for said cam and a gate to prevent said follower from following said cam, a first latch normally ineffective to hold one said gate effective, a plurality of second latches to hold the other gates effective, a plurality of means selectively settable active or inactive to be actuated by selected ones of said sensing pins each to disable one of said latches and to enable another latch, each said means including one or more settable interponents, a member actuated by one of said sensing pins through one of said interponents and a scissors mechanism operated by said member to disable its associate latch; and a scissors mechanism operated by either said member to enable said other latch.

3. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means each to move certain of said slides to locking position and each including a cam, a follower for said cam and a gate to prevent said follower from following said cam, a first latch normally ineffective to hold one said gate effective, a plurality of second latches normally effective to hold the other gates effective, a member associated with each second latch and actuated by one of said sensing pins, a scissors mechanism operated by each said member to disable the associate second latch, a second member actuated by either first said member, and a scissors mechanism operated by said second member to enable said first latch.

4. In a machine of the class described, combination of a reciprocating carrier, a plurality of rows of sensing pins in said carrier, one or more locking slides to lock the sensing pins finding perforations in a card in fixed position relative to the carrier, a plurality of means to move said slides to locking position selectively including a cam, a follower for said cam and a gate to prevent said follower from following said cam, a first latch normally ineffective to hold a said gate effective, a plurality of second latches each normally effective to hold a said gate effective, card controlled means to disable said second latches and enable said first latch, and a third latch manually settable active or inactive to disable said second latches.

5. In a machine of the class described, the combination of a reciprocating carrier, a plurality of rows of sensing pins in said carrier, one or more locking slides to lock the sensing pins finding perforations in a card in fixed position relative to the carrier, a plurality of means to move said slides to locking position selectively including a cam, a follower for said cam and a gate to prevent said follower from following said cam, a first latch normally ineffective to hold a said gate effective, a plurality of second latches each normally effective to hold a said gate effective, a member associated with each second latch and actuated by one of said sensing pins, a scissors mechanism operated by each said member to disable the associate second latch, a second member actuated by either first said member, a scissors mechanism operated by said second member to enable said first latch, and a third latch manually settable active or inactive to hold said second latches disabled.

6. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means each to move certain of said slides to locking position and each including a cam, a follower for said cam and a gate to prevent said follower from following said cam, a plurality of latches, one to hold each gate effective, a plurality of means actuated by certain of said sensing pins each to disable one of said latches and to enable another, total control means, and a latch for each gate actuated by said total control means to hold said gate selectively effective or ineffective.

7. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means each to move certain of said slides to locking position and each including a cam, a follower for said cam and a gate to prevent said follower from following said cam, a plurality of latches, one to hold each gate effective, a plurality of means actuated by certain of said sensing pins each to disable one of said latches and enable another, total control means including a member held in operated position for the duration of a totaling operation, and a normally disabled latch for each gate enabled by the last said member, each said latch holding its gate in fixed position relative to the associated cam for the duration of the totaling operation.

8. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means each to move certain of said slides to locking position and each including a cam, a follower for said cam and a gate to prevent said follower from following said cam, a first latch normally ineffective to hold one said gate effective, a plurality of second latches normally effective to hold the other gates effective, a member associated with each second latch and actuated by one of said sensing pins to disable the second latch, a second member actuated by either first said member to enable said first latch, a normally closed card stop, means to open said card stop, a card feed mechanism, a lock to disable said card feed mechanism, power driven means to move said lock to locking position, an interponent moved by said power driven means into position to disable the card stop opening means, and a second lock moved by said second member into position to retain said interponent and the first said lock each in effective position.

9. In a machine of the class described, the combination of a reciprocating carrier, a plurality of rows of sensing pins in said carrier, one or more locking slides for each row of pins, said slides being adapted to lock up those pins finding holes in a card, a plurality of means to move said slides to locking position selectively, each including a cam, a follower for said cam and a gate to prevent said follower from following said cam, a plurality of latches, one to hold each gate effective, a plurality of means actuated by certain of said sensing pins each to disable one of said latches and to enable another, a normally closed card stop, means to open said card stop, a card feed mechanism, a normally disabled lock to prevent operation of said card feed mechanism, power driven means to enable said lock, an interponent moved into position to disable the card stop opening means by said power driven means, and a second lock moved by the sensing pin actuated means into position to retain said interponent and the first said lock in effective position.

10. In a machine of the class described, the combination of a reciprocating carrier, a plurality of rows of sensing pins in said carrier, one or more locking slides for each row of pins, said slides being adapted to lock up those pins finding holes in a card, a plurality of means to move said slides to locking position selectively, each including a cam, a follower for said cam and a gate to prevent said follower from following said cam, a plurality of latches, one to hold each gate effective, a plurality of means actuated by certain of said sensing pins each to disable one of said latches and to enable another, a normally closed card stop, means to open said card stop, a card feed mechanism, a normally disabled lock to prevent operation of said card feed mechanism, power driven means to enable said lock, an interponent moved into position to disable the card stop opening means by said power driven means, a second lock moved by the sensing pin actuated means from a disabled position into position to retain said interponent and the first said lock in effective position, and a member actuated by a selected one of said sensing pins to move said second lock to a second disabled position.

11. In a machine of the class described, the combination of a sensing mechanism including a plurality of sensing pins, a normally closed card stop, means to open said card stop, a card feed mechanism, a lock to disable said card feed mechanism, power driven means to move said lock to locking position, an interponent moved by said power driven means into position to disable the card stop opening means, a second lock to retain said interponent and the first said lock in effective position, and means actuated by a selected one of said sensing pins to move said second lock to locking position.

12. In a machine of the class described, the combination of a sensing mechanism including a plurality of sensing pins, a normally closed card stop, means to open said card stop, a card feed mechanism, a lock to disable said card feed mechanism, power driven means to move said lock to locking position, an interponent moved by said power driven means into position to disable the card stop opening means, a second lock to retain said interponent and the first said lock in effective position, means actuated by a selected one of said sensing pins to move said second lock from a disabled position to locking position, and means actuated by a selected other one of said sensing pins to move said second lock to a second disabled position.

13. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means actuated selectively on successive reciprocations of said carrier each to move certain of said slides to locking position, each said means including a cam, a follower for said cam carried by said carrier, and a gate to prevent said follower from following said cam; a latch to hold each gate effective, one latch being normally disabled, a plurality of members actuated on successive reciprocations of the carrier by selected sensing pins to disable the effective latches, and a second member actuated by any of the first said members to enable the normally disabled latch.

14. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means actuated selectively on successive reciprocations of said carrier each to move certain of said slides to locking position, each said means including a cam, a follower for said cam carried by said carrier and and a gate to prevent said follower from following said cam; a latch to hold each gate effective, one latch being normally disabled, a plurality of members actuated on successive reciprocations of the carrier by selected sensing pins to disable the effective latches, a second member actuated by any of the first said members to enable the normally disabled latch, a normally disabled latch to hold each gate in effective or ineffective position regardless of the first mentioned latches, and means to enable the last said latch.

15. In a machine of the class described, the combination of a reciprocating carrier, a plurality of rows of sensing pins in said carrier, one or more locking slides for each row of pins, said slides being adapted to latch the pins that find perforations in a card in fixed position relative to said carrier, a plurality of means actuated selectively on successive reciprocations of said carrier each to move certain of said slides to locking position, each said means including a cam, a follower for said cam carried by said carrier and a gate to prevent said follower from following said cam; a latch to hold each gate effective, one such latch being normally disabled, a plurality of members actuated on successive reciprocations of the carrier by selected sensing pins to disable the effective latches, a second member actuated by any of the first said members to enable the normally disabled latch, a normally disabled latch to hold each gate in effective or ineffective position regardless of the first mentioned latches, a blank cycle device, a total control unit, and means actuated by said device or said control unit to enable the last said latch.

16. In a machine of the class described, the combination of a reciprocating carrier, a series of rows of sensing pins in said carrier, one or more locking slides for each row of pins, said slides being adapted to latch the pins that find perforations in a card in fixed position relative to said carrier, a plurality of means each to move certain of said locking slides to locking position, one or more blank slides interconnecting said means, a no card pin carried by said carrier, a member operable with one of said means, a latch carried by said member, a lever operated by said no card pin, and a member carried by said lever and moved into the path of movement of said latch to prevent operation of said means.

17. In a machine of the class described, the combination of a reciprocating carrier, a series of rows of sensing pins in said carrier, one or more locking slides for each row of pins, said slides being adapted to latch the pins that find perforations in a card in fixed position relative to said carrier, a plurality of means each to move certain of said locking slides to locking position, and each including a blade connected with the associate slides, one or more blank slides, connected with a certain blade, extrusions on said blank slides to prevent movement of the other blades when movement of said certain blade is prevented, a no card pin carried by said carrier, a lever operated by said no card pin, a member operable with the means with which said certain blade is associated, a latch carried by said member, and a member carried by said lever and moved when the latter is operated into the path of movement of said latch to prevent movement of said certain blade.

HAROLD P. MIXER.

No references cited.